Figure 5:
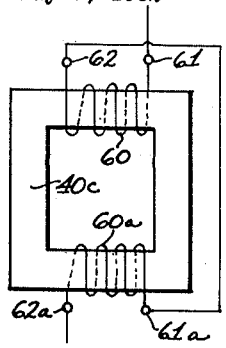

Dec. 24, 1963   J. L. GAASENBEEK   3,115,571
VARIABLE FORGE PULSE GENERATOR FOR RESISTANCE WELDERS
Filed May 7, 1962   2 Sheets-Sheet 1

INVENTOR
Johannus L. Gaasenbeek
BY
James A. Lamb
PATENT AGENT

Dec. 24, 1963 J. L. GAASENBEEK 3,115,571
VARIABLE FORGE PULSE GENERATOR FOR RESISTANCE WELDERS
Filed May 7, 1962 2 Sheets-Sheet 2

INVENTOR
Johannus L. Gaasenbeek
BY James A. Hamly
PATENT AGENT

United States Patent Office 3,115,571
Patented Dec. 24, 1963

3,115,571
VARIABLE FORGE PULSE GENERATOR FOR RESISTANCE WELDERS
Johannus Leonardus Gaasenbeek, Port Hope, Ontario, Canada, assignor to Atomic Energy of Canada Limited, Ottawa, Ontario, Canada, a corporation
Filed May 7, 1962, Ser. No. 193,368
13 Claims. (Cl. 219—86)

This invention relates to magnetic force resistance welding apparatus, and in particular it relates to means for varying the magnetic repulsive forces between parallel conductors carrying the weld current in magnetic force resistance welding apparatus.

Resistance welding apparatus, or more simply resistance welders, which use magnetic repulsive forces to increase the pressure between welding electrodes are known. These welders generally have a movable and a fixed electrode with a source of welding current connected across the electrodes. The connection supplying current to the movable electrodes comprises parallel conductors connected in series. The parallel conductors are either adjacent and separated by a layer of insulation or spaced apart but in relatively close proximity to one another. The conductors are arranged so that at least some portion can flex or move in response to magnetic forces and thereby increase electrode pressure. Briefly, in the operation of a welder of this type, an initial pressure is normally applied by the movable electrode to a work piece held between the two electrodes. The power source is turned on, and as the current begins to flow, a magnetic repulsive force builds up between the two parallel conductors bending to move them apart. The separating force is applied to the movable electrode to increase the electrode pressure on the work piece. Thus, it is possible to have a low initial pressure to provide high contact resistance, and a pulse of increasing pressure to prevent expulsion of high spots shortly after the weld current begins to flow.

The prior art apparatus suffers from the disadvantage that the magnetic repulsive force is frequently not sufficient. This may happen, for example, in operations where a low weld current is desirable. Attempts have been made to overcome this by altering the configuration of the parallel conductors. This is, however, not a convenient way to increase the effect of the magnetic repulsive forces.

Also, in the prior art welders there is no convenient means for controlling the amplitude and timing of the pressure pulse or forge pulse as it is sometimes called created by the magnetic forces. This pressure pulse could, heretofore, be controlled by changing the weld current in some manner, by changing the configuration of the parallel conductors, or by adding complex and expensive equipment to act independently on the movable electrode.

It is desirable, under some circumstances to be able to increase, decrease, or vary the timing relative to the weld current of the pressure pulse created by the magnetic repulsive forces, and it is desirable to be able to do this in a simple manner. In other words, it is desirable to have control over the pressure pulse and to be able to provide this control simply and conveniently.

It is therefore an object of this invention to provide in a magnetic force resistance welder a convenient means enabling the electrode pressure resulting from magnetic repulsive forces for a given weld current to be increased.

It is another object of this invention to provide in a magnetic force resistance welder a simple magnetic means for controlling the electrode pressure pulse without altering the weld current or conductor configuration.

It is yet another object of this invention to provide in a magnetic force resistance welder a magnetic core around the parallel conductors to vary the effect of the magnetic repulsive forces between the conductors.

Figure 1:
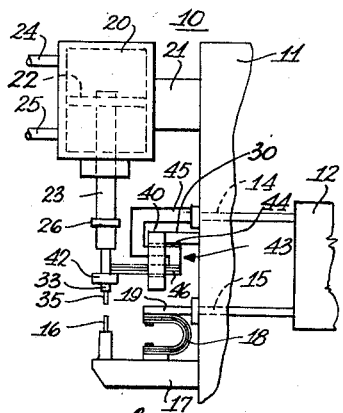
Figure 2:
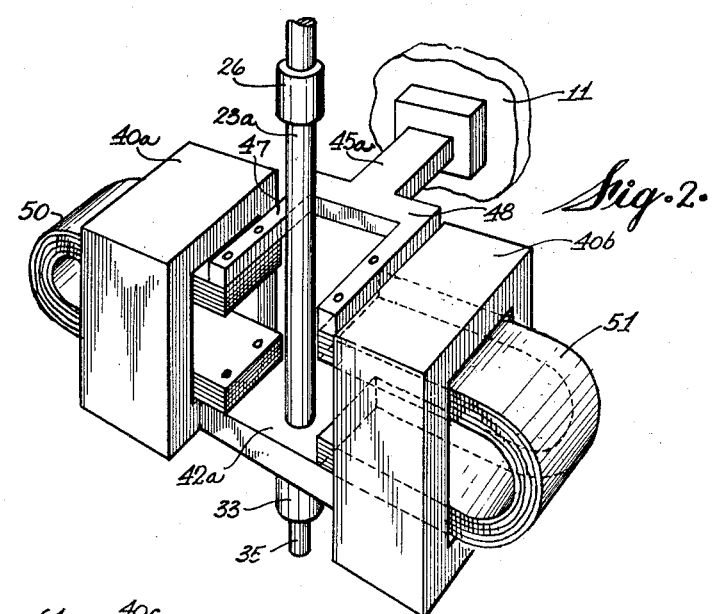
Figure 3:
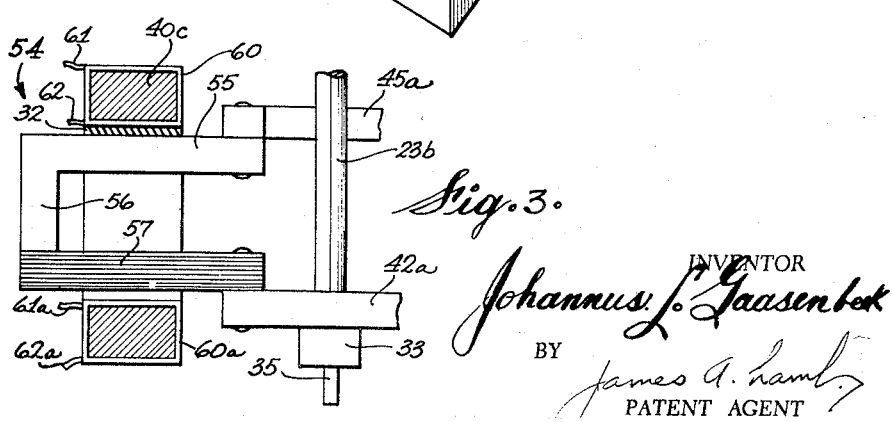
Figure 4:
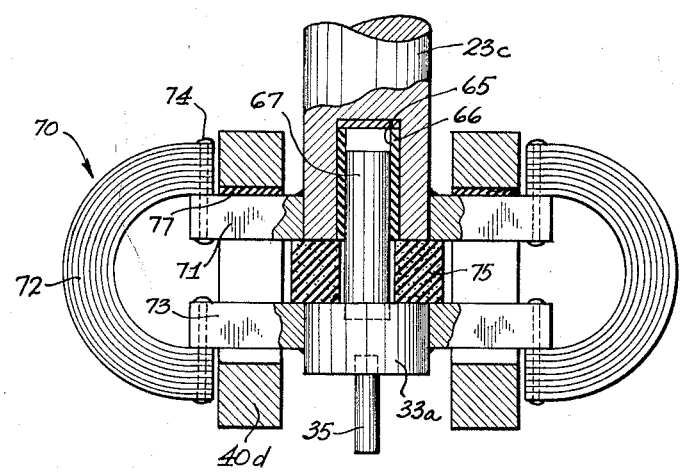

Other objects and advantages of this invention will appear to those of ordinary skill in the art from the following description taken in conjunction with the accompanying drawings, in which:

FIGURE 1 is a partial schematic side view of one type of a magnetic force resistance welder embodying the invention, FIGURE 2 is a isometric view of a portion of a magnetic force resistance welder showing the movable electrode thereof and embodying one form of the invention, FIGURE 3 is a fragmentary side view showing the movable electrode of a magnetic force resistance welder and embodying another form of the invention with portions removed for simplicity, FIGURE 4 is a fragmentary side view, partly in section, showing the movable electrode of a magnetic force resistance welder and embodying another form of the invention, and FIGURE 5 is a schematic diagram useful in explaining the operation of FIGURE 3.

Briefly, the invention comprises, in a magnetic force resistance welder having a fixed electrode and a movable electrode and substantially parallel conductors connected in series to supply current to said movable electrode, a magnetic core encircling said parallel conductors. The core may have one or more control windings thereon.

Referring now to FIGURE 1, a welder 10 is shown having a frame 11 with a power supply 12 mounted therein. The power supply 12 has two conductors 14 and 15 extending therefrom to conduct the welding current to the electrodes. A relatively stationary electrode 16 is supported by bracket 17 mounted on frame 11. Electrode 16 is connected to conductor 15 by a flexible lead 18 and a terminal bracket 19. The flexible lead will permit adjustment of the electrode 16 for different welding operations.

A cylinder 20 is mounted to frame 11 by a mounting bracket 21. The cylinder 20 contains a piston 22, which has a connecting arm 23 extending downwards through a wall of the cylinder. The cylinder 20 is a pneumatic or hydraulic cylinder equipped with ports 24 and 25 which are connected to a source of hydraulic fluid (not shown) to enable piston 22 to be moved within the cylinder or to apply predetermined pressures to the piston 22. It will, of course, be apparent that a flexible air operated diaphragm arrangement could be used instead of the piston 22 under some conditions as is well known in the art.

The arm 23 includes an insulator 26 to insulate the piston 22 and cylinder 20 and thus the frame 11 from a welding electrode mounted on the lower end of arm 23. It will, of course, be apparent that instead of insulator 26 insulating the piston and cylinder assembly, an insulator could be used between bracket 21 and frame 11. This would also provide electrical isolation between the frame and the movable electrode.

Fastened to the end of arm 23 is a connector 42 and an electrode holder 33 holding a movable electrode 35. Connector 42 is fastened to one end of a parallel conductor assembly 43 which comprises conductors 44 and 46. The conductors 44 and 46 may be adjacent and separated by a layer of insulation, or they may be spaced as shown. The conductors 44 and 46 are conductively joined at one end. The other end of conductor 46 is fastened to connector 42 as previously mentioned and the other end of conductor 44 is secured to bus bar 45 which connects to conductor 14. The bus bar 45 is rigidly mounted to frame 11, and insulated therefrom, and consequently the end of conductor 44 connected to bus bar 45 is fixed. The forces developed in assembly 43 are sometimes quite large and it is desirable to have a strong mount to frame 11.

The parallel conductor assembly 43 is constructed so that at least some portion of it is flexible, and magnetic forces developed between conductors 44 and 46 tend to move the conductors apart causing electrode 35 to be pressed downwards. There are several constructions that are suitable for the conductor assembly 43 as will be apparent. For example, the entire assembly 43 may be made of flexible conducting material as will be later described in connection with FIGURE 2, one or both of conductors 44 and 46 may be made of flexible material or portions thereof, or only the connecting portion may be made flexible. In FIGURE 1, the conductor 46 is shown as being laminated and flexible. A preferred construction will be mentioned later in connection with FIGURE 4.

The description of welder 10 of FIGURE 1 thus far applies to known welders, and the operation of such welders is well known. Briefly, a work piece is placed between electrodes 35 and 16, and the cylinder 20 is supplied with fluid pressure at port 24 to move arm 23 downwards until the work piece is engaged between the electrodes. The power supply 12 then applies a voltage, and current flows through conductor 14, bus bar 45, conductors 44 and 46, electrode 35, the work piece, electrode 16, bracket 17, lead 18, terminal bracket 19, and conductor 15 to the power supply. The current flowing through conductors 44 and 46 develops a magnetic repulsive force thereby increasing the pressure on the work through the electrode 35. This pressure pulse is sometimes referred to as a forge pulse. The pressure on the upper piston surface should of course be maintained during the actual welding, and the mass of arm 23 and its associated parts should be kept low to decrease the inertia associated with the downward movement caused by flexing of the conductor 46.

As previously mentioned, the magnetic repulsive force developed by a given weld current may not be sufficient. The present invention includes a magnetic core 40 surrounding or encircling the parallel conductors 44 and 46. The core 40 may be rigidly secured to frame 11 by one or more supports 30 as shown. The magnetic core 40, which may be termed a "flux concentrating core" serves to increase the effect of the magnetic repulsive forces. It will, of course, be apparent that different sizes of core 40 having different amounts of iron surrounding the parallel conductor assembly 43 will affect the pressure exerted by electrode 35 in different degrees. Consequently, varying the core will vary the size of the pressure pulse exerted by the electrode 35.

By including a control winding or control windings wound around core 40, as will be described in more detail in connection with FIGURES 3 and 5, the pressure pulse at electrode 35 may be readily varied. Pulses of current of desired form or waveshape and having a desired phase relationship with the weld current pulse applied to such a control winding can affect both the amplitude of the pressure pulse and the timing of the pressure pulse relative to weld current flow.

FIGURE 2 is an isometric view showing the connecting arm, movable electrode, parallel conductor assembly with a magnetic core on a welder of the general type of 10. In FIGURE 2 bus bar 45a is bifurcated to accommodate a connecting arm 23a. Arms 47 and 48 extend on either side of connecting arm 23a and are connected to U-shaped conductors 50 and 51, respectively. The other ends of conductors 50 and 51 are fastened to connector 42a carried at the end of arm 23a. The parallel conductor assemblies 50 and 51 are encircled or surrounded by magnetic cores 40a and 40b. As before, it is desirable to have cores 40a and 40b fixed and this can be accomplished, for example, by supports (not shown) similar to support 30 of FIGURE 1 extending from cores 40a and 40b to frame 11. The operation of this arrangement is the same as the operation of welder 10 of FIGURE 1 and no further description is believed to be necessary.

FIGURE 3 shows a partial side view of a movable electrode having a parallel conductor assembly generally similar to that of FIGURE 2. The parallel conductor assembly is designated 54 and comprises an upper conductor 55, an end conductor 56 and a lower laminated conductor 57. The conductors 55 and 56 are relatively rigid and are secured to the bus bar 45a. The lower conductor 57 is flexible.

The FIGURE 3 arrangement using a partly rigid and partly flexible parallel conductor assembly 54 is one preferred form. It has been found that this arrangement enables the pressure applied by electrode 35 to be confined more closely to the desired direction and minimizes the effects caused by discontinuity at the end of the loop comprising the parallel conductors.

A magnetic core 40c encircles or surrounds the parallel conductor assembly 54 and has control windings 60 and 60a thereon. The upper part of core 40c may be adjacent the upper conductor 55, which is fixed, and the winding 60 separated from it by a layer of insulation 32. The ends 61 and 62 of control winding 60 and ends 61a and 62a of control winding 60a are connected to a source of control voltage of suitable waveform (not shown). The windings 60 and 60a may be connected in series or in parallel, however they must be connected in such a way that each winding induces a field of the same polarity. For example, referring to the plane of the FIGURE 3 drawing, if the lines of magnetic flux are coming out of the winding 60, then they should also be coming out of winding 60a. A suitable series connection is shown in FIGURE 5. In FIGURE 5, wires 62 and 61a are connected together and the wires 61 and 62a are connected to a suitable generator (not shown). Generators providing a constant output or an output of varying waveform are known. Such a generator could be synchronized to the beginning of flow of weld current to apply a voltage of desired waveform at a desired phasing to ends 61, 62, 61a and 62a to cause varying amounts of flux in core 40c and thereby control the pressure pulse at electrode 35.

It will be apparent that a single control winding may be used, for example winding 60. As previously explained, the use of a core 40 alone serves to intensify the effect of the repulsive forces between the parallel conductors. A single control winding such as 60 may be used to saturate the core and decrease the intensifying effect of the core. However, when two windings are used, and connected as shown by way of example in FIGURE 5, the repulsive effect can be increased over and above the effect obtained by the core alone. The two windings can also be used to cause saturation of the core to decrease the repulsive effect as with the single winding. Consequently the use of two or more control windings will give a wider range of control.

FIGURE 4 shows a preferred form of movable electrode, parallel conductor assembly, and flux concentrating core. This preferred form reduces the inertia of the movable electrode to a very low level, it maintains the axial alignment of the movable electrode, and reduces the influence of the magnetic core on the current passing through the loop at the end of the parallel conductors. The connecting arm 23c has a cylindrical hole 65 in the end which received an insulating bushing 66. A rod 67 slidably engages the inside of bushing 66 and has an electrode holder 33a secured to one end. The movable electrode 35 is carried by the electrode holder 33a. The parallel conductor assembly is again a balanced one, that is, a portion extends on each side of connecting arm 23c. It is believed that a description of one portion or side of the parallel conductor assembly will provide an understanding of FIGURE 4.

The parallel conductor assembly is designated generally as 70 and comprises an upper conductor 71 fastened to the end of connecting arm 23c, a flexible laminated end conductor 72, and a lower conductor 73 fastened to electrode holder 33a. The end conductor 72 is fastened to the upper surface and lower surface respectively of the ends of conductors 71 and 73 by any convenient means such as rivets 74, etc. Because of the manner in which electrode 35 is mounted and guided in the end of connecting arm 23c, it is possible to use a flexible braided conductor in place of laminated conductor 72. In other words, in the FIGURE 4 construction, it is not necessary that the end conductors 72 impart any positioning or guidance to the movable electrode 35 because this is done by the bushing and rod mounting.

A rubber washer 75 surrounds rod 67 and spaces conductors 71 and 73. A core 40d encircles or surrounds the conductors 71 and 73 between the end conductor 72 and the connecting arm 23c. The core 40d may be mounted to the upper conductor 71 and may be spaced therefrom by a layer of insulation 77. As before, one or more control windings (not shown) may be wound on core 40d.

In the FIGURE 4 form of the invention, the weld current is supplied to arm 23c by a suitable connector. The weld current would then flow from connecting arm 23c to upper conductor 71, conductor 72, conductor 73, electrode holder 33a, and movable electrode 35. When this embodiment of a welder is being operated, the connecting arm 23c is moved downwards to hold a work piece between electrode 35 and a fixed electrode 16. The rubber washer provides a cushioning effect and transmits the initial pressure from the connecting arm 23c to the electrode holder 33a and movable electrode. As the weld current begins to flow the repulsive forces between conductors 71 and 73 begin to buid up increasing the downward pressure exerted by the electrode 35. When the electrode 35 moves downwards under these repulsive forces it carries with it only the holder 33a and the rod 67. Consequently the inertia of the electrode and associated parts is low. Depending on the fit of bushing 66 and rod 67, it may be necessary to vent the upper end of hole 65 to atmosphere by providing vent holes through connecting arm 23c from hole 65 to atmosphere.

The FIGURE 4 construction has a large end loop conductor 72 that begins and ends above and below the parallel conductors 71 and 73. The core 40d has little effect on the end of the loop currents because of the position of conductor 72 with respect to core 40d.

An alternative construction to that of FIGURE 4 is to use the air trapped in hole 65 above the end of rod 67 as a cushion. This air cushion could then be used to transmit the initial pressure from arm 23c to electrode 35 and the rubber washer 75 would not be necessary.

From the foregoing it will be apparent that a simple and convenient means has been disclosed for controlling the magnetic repulsive forces in a magnetic force resistance welder.

I claim:

1. In a magnetic force resistance welder having a fixed electrode and a movable electrode and conductors positioned substantially parallel to one another and connected in series to supply current to said movable electrode, a magnetic core encircling said parallel conductors.

2. In a magnetic force resistance welder having a fixed electrode and a movable electrode and conductors positioned substantially parallel to one another and connected in series to supply current to said movable electrode, a continuous magnetic core encircling said parallel conductors in a plane substantially at right angles to said conductors.

3. In a magnetic force resistance welder having a fixed electrode and a movable electrode and conductors positioned substantially parallel to one another and connected in series to supply current to said movable electrode, a magnetic core encircling said parallel conductors, and at least one control winding on said core.

4. A magnetic force resistance welder comprising, spaced electrodes adapted to receive a workpiece therebetween, one of said electrodes being substantially fixed and the other being movable, means to apply an initial pressure to said movable electrode to cause said workpiece to be gripped between said electrodes, spaced substantially parallel conductors connected in series to supply weld current to said movable electrode, means mechanically connecting said parallel conductors and said movable electrode whereby weld current flowing through said parallel conductors creates magnetic repulsive forces tending to move the conductors apart increasing the pressure exerted by said movable electrode, and a magnetic core encircling said parallel conductors over a substantial portion of the length thereof.

5. A magnetic force resistance welder according to claim 4 wherein said parallel conductors comprise a first substantially rigid conductor, a second flexible conductor substantially parallel to said first conductor and a third conductor joining adjacent ends of said first and second conductors.

6. A magnetic force resistance welder according to claim 5 wherein said second conductor is laminated.

7. A magnetic force resistance welder according to claim 4 having at least one control winding on said magnetic core.

8. A magnetic force resistance welder according to claim 4 having a pair of control windings positioned opposite one another on said core and wound so each will induce a magnetic field of the same polarity.

9. A parallel conductor assembly for a magnetic force resistance welder comprising a first substantially rigid conductor, a second substantially rigid conductor secured to one end of said first conductor and projecting therefrom at right angles, a third flexible laminated conductor joined to the other end of said first conductor and being substantially parallel to said first conductor.

10. A magnetic force resistance welder comprising a movable arm provided with a cylindrical opening axially located in an end of said arm, an insulating bushing in said opening, a rod slidably engaging said bushing for longitudinal movement therein and having an end projecting past the end of said arm, an electrode holder fastened to the said projecting end of said rod, a movable electrode carried by said electrode holder, an insulating washer around said rod between said electrode holder and the said end of said arm, a parallel conductor assembly comprising a first rigid conductor fastened to said end of said movable arm and projecting therefrom substantially at right angles to the axis of said arm, a second rigid conductor fastened to said electrode holder and projecting therefrom, said first and second conductors being substantially parallel to one another, and a third U-shaped flexible conductor joining the adjacent ends of said first and second conductors remote from the axis of said arm, means to supply weld current through said parallel conductor assembly to said movable electrode, and a magnetic core encircling said first and second conductors.

11. A magnetic force resistance welder according to claim 9 wherein said third conductor is fastened to said first conductor on the side thereof remote from said second conductor and is fastened to said second conductor on the side thereof remote from said first conductor.

12. A magnetic force resistance welder according to claim 9 wherein said first conductor comprises two portions projecting from opposite sides of said arm and said second conductor comprises two portions projecting from opposite sides of said electrode holder.

13. In a magnetic force resistance welder having a movable electrode carrying arm provided with an axially located cylindrical opening in an end of said arm, an insulating bushing lining said opening, a rod slidably engaging said bushing for longitudinal movement therein and having an end projecting past the end of said arm, an electrode holder fastened to the projecting end of said rod, an insulating washer around said rod between the end of said arm and said electrode holder, and a parallel conductor assembly comprising a first rigid conductor fastened to said end of said movable arm and projecting therefrom substantially at right angles to the axis of said arm, a second rigid conductor fastened to said electrode holder and projecting therefrom, said first and second conductors being substantially parallel to one another, and a third U-shaped flexible conductor joining the adjacent ends of said first and second conductors remote from the axis of said arm.

References Cited in the file of this patent

UNITED STATES PATENTS

| | | |
|---|---|---|
| 2,330,658 | Albright | Sept. 28, 1943 |
| 2,382,711 | Hagedorn | Aug. 14, 1945 |
| 2,386,261 | Redmond | Oct. 9, 1945 |